United States Patent
Rasanen et al.

(10) Patent No.: US 10,986,104 B2
(45) Date of Patent: Apr. 20, 2021

(54) REMOTE MALWARE SCANNING CAPABLE OF STATIC AND DYNAMIC FILE ANALYSIS

(71) Applicant: F-Secure Corporation, Helsinki (FI)

(72) Inventors: Pekka Rasanen, Oulu (FI); Ville Lindfors, Vantaa (FI)

(73) Assignee: F-Secure Corporation, Helsinki (FI)

( * ) Notice: Subject to any disclaimer, the term of this patent is extended or adjusted under 35 U.S.C. 154(b) by 227 days.

(21) Appl. No.: 15/808,478

(22) Filed: Nov. 9, 2017

(65) Prior Publication Data
US 2018/0139216 A1    May 17, 2018

(30) Foreign Application Priority Data
Nov. 15, 2016 (GB) ................................ 1619288

(51) Int. Cl.
| | |
|---|---|
| H04L 29/06 | (2006.01) |
| G06F 16/14 | (2019.01) |
| G06F 16/951 | (2019.01) |
| G06F 21/56 | (2013.01) |

(52) U.S. Cl.
CPC ........ H04L 63/1416 (2013.01); G06F 16/148 (2019.01); G06F 16/951 (2019.01); G06F 21/56 (2013.01); H04L 63/145 (2013.01)

(58) Field of Classification Search
None
See application file for complete search history.

(56) References Cited

U.S. PATENT DOCUMENTS

| | | | | |
|---|---|---|---|---|
| 8,281,399 B1* | 10/2012 | Chen | ...... | G06F 21/564 726/24 |
| 9,087,194 B2* | 7/2015 | Stahlberg | ...... | G06F 21/56 |
| 10,339,315 B2* | 7/2019 | Park | ...... | G06F 21/566 |
| 2001/0005889 A1* | 6/2001 | Albrecht | ...... | G06F 21/56 726/24 |
| 2008/0141371 A1* | 6/2008 | Bradicich | ...... | G06F 21/552 726/23 |
| 2010/0077482 A1* | 3/2010 | Adams | ...... | G06F 21/564 726/24 |
| 2012/0054870 A1* | 3/2012 | Stahlberg | ...... | G06F 21/56 726/24 |
| 2012/0079596 A1* | 3/2012 | Thomas | ...... | G06F 21/55 726/24 |

(Continued)

OTHER PUBLICATIONS

WO2014168408, Kim et al., English Translation, Oct. 2014, p. 1-34. (Year: 2014).*

(Continued)

*Primary Examiner* — Jeffery L Williams
(74) *Attorney, Agent, or Firm* — Harrington & Smith

(57) ABSTRACT

There are provided measures for enabling resource-efficient remote malware scanning capable of static and dynamic file analysis. Such measures could exemplarily comprise include, at a local entity, comparing file items of an electronic file to be scanned for malware with the file items of previously scanned electronic files, generating a recipe of the electronic file to be scanned, sending the generated recipe of the electronic file to be scanned for malware to a remote entity for enabling reconstructing the electronic file by assembling its file items on the basis of the obtained recipe and executing a dynamic malware analysis on a runtime behavior of the reconstructed electronic file.

22 Claims, 6 Drawing Sheets

(56) References Cited

U.S. PATENT DOCUMENTS

| | | | |
|---|---|---|---|
| 2012/0151586 A1* | 6/2012 | Hentunen | G06F 21/563 726/24 |
| 2012/0173656 A1* | 7/2012 | Sorenson, III | H04L 67/2804 709/217 |
| 2013/0019306 A1* | 1/2013 | Lagar-Cavilla | G06F 21/566 726/22 |
| 2013/0111591 A1* | 5/2013 | Topan | G06F 21/563 726/24 |
| 2015/0088967 A1* | 3/2015 | Muttik | G06F 21/55 709/203 |
| 2015/0089647 A1* | 3/2015 | Palumbo | H04L 63/145 726/23 |
| 2015/0121522 A1* | 4/2015 | Guido | H04L 63/145 726/23 |
| 2015/0229673 A1* | 8/2015 | Lee | G06F 21/56 726/1 |
| 2016/0248786 A1* | 8/2016 | Ylipekkala | H04L 63/145 |
| 2018/0139216 A1* | 5/2018 | Rasanen | G06F 21/56 |

OTHER PUBLICATIONS

Stephen Mkandawire, "Improving Backup and Restore Performance for Deduplication-based Cloud Backup Services", University of Nebaska, Apr. 2012, p. 1-74. (Year: 2012).*
Kang B.B.H., Srivastava A. (2011) Dynamic Malware Analysis. In: van Tilborg H.C.A., Jajodia S. (eds) Encyclopedia of Cryptography and Security. Springer, Boston, MA (Year: 2011).*
Berning, Tony, "Scanning Android Package Files (APKs) with Metadefender Cloud", Nov. 4, 2014, OPSWAT Blog, 4 pgs.

\* cited by examiner

REMOTE MALWARE SCANNING CAPABLE OF STATIC AND DYNAMIC FILE ANALYSIS

FIELD

The present invention relates to remote malware scanning capable of static and dynamic file analysis. More specifically, the present invention relates to measures (including methods, apparatuses and computer program products) for enabling remote malware scanning which is capable of executing static and dynamic file analysis for malware scanning.

BACKGROUND

Nowadays, malware scanning is a vital issue in any kind of networks, and is generally directed to identify (and potentially also disinfect) any kind of malware on computer and/or communication systems, such as e.g. viruses, Trojans, worms, or the like. Malware scanning techniques can basically be distinguished in local and remote malware scanning techniques. In local techniques, malware scanning is performed by a dedicated program or application being locally installed on the system to be scanned (i.e. a host). In remote techniques, malware scanning is performed by a dedicated engine or application being arranged on a specific server or any other kind of entity (e.g. in a cloud implementation) which is remotely connected with the system to be scanned via a network (wherein such entity and the system to be scanned can but do not need to be located at different locations).

Remote malware scanning techniques have various advantages over local malware scanning techniques. For example, it is advantageous that only a limited number of remote malware scanning engines or applications needs to be implemented for enabling remote scanning of a greatly larger number of hosts. Further, it is advantageous that reverse engineering of locally installed malware scanning programs or applications at hosts e.g. by a malware author or any malicious entity (for recognizing underlying malware scanning mechanisms for the purpose of circumventing the same) is prevented (as no such local programs or applications are installed and used), thus improving security and reliability.

Yet, remote malware scanning techniques require the communication of data over the network from the system to be scanned to the remote entity performing the remote scanning. In conventional remote malware scanning techniques, it is typically required to upload the entire file to be scanned, thus incurring significant traffic over the network (when a large number of hosts are subject to remote malware scanning) and/or large computational effort and increased time and storage requirements for malware scanning at any remote entity (when a large number of hosts are handled by the same remote entity).

Accordingly, it is desirable to enable resource-efficient remote malware scanning, i.e. to reduce the amount of data to be sent over the network as well as to reduce computational effort and time and storage requirements for remote malware scanning.

In conventional techniques for reducing the amount of data to be sent over the network for enabling remote malware scanning, it is typically proposed that only a portion of the file to be scanned is uploaded. That is, only those parts of the file to be scanned can be uploaded, which are considered as relevant for malware scanning (e.g. because of being of a malware-susceptible type or format), while other parts of the file to be scanned are not uploaded. However, while an improvement in bandwidth, time and storage requirements could be achieved thereby, such conventional techniques are detrimental in that only the thus uploaded parts can be subject to malware scanning, i.e. a static analysis of these parts can be performed. However, since only a portion of the file to be scanned is available at the remote entity, it is not possible to perform a dynamic analysis of the entire file so as to analyze the runtime behavior of the file as such.

Accordingly, it is desirable to enable resource-efficient remote malware scanning which is capable of executing static and dynamic file analysis for malware scanning, thus impeding corruption of security and/or reliability.

SUMMARY

Various exemplifying embodiments of the present invention aim at addressing at least part of the above issues and/or problems.

Various aspects of exemplifying embodiments of the present invention are set out in the appended claims.

According to an example aspect of the present invention, there is provided a method of remote malware scanning, the method comprising: A) comparing, at a first node, file items of an electronic file to be scanned for malware with the file items of previously scanned electronic files; B) in the event a previously scanned electronic file including a predetermined number of same file items as the electronic file to be scanned is found on the basis of the comparison, generating a recipe of the electronic file to be scanned; C) sending the generated recipe of the electronic file to be scanned for malware from the first node to a second node for enabling the second node to reconstruct the electronic file by assembling its file items on the basis of the obtained recipe and executing a dynamic malware analysis on a runtime behavior of the reconstructed electronic file, wherein said recipe includes at least information for: identification of one or more file items contained in the electronic file, identification of the previously scanned electronic file that was found and the result of the comparison of the electronic file to be scanned with the previously scanned electronic file; and D) receiving, at the first node, the result of the dynamic malware analysis.

According to an example aspect of the present invention, there is provided a method of remote malware scanning, the method comprising: receiving, at a second node, a recipe of an electronic file to be scanned for malware from a first node, said recipe including at least information for: identification of one or more file items contained in the electronic file, identification of a previously scanned electronic file including a predetermined number of same file items than the electronic file and that was found from a knowledge base of the first node, and a result of a comparison of the electronic file to be scanned with the previously scanned electronic file performed by the first node; reconstructing, at the second node, the electronic file by assembling its file items, including any file item of the electronic file, which is received from the first node, and any remaining file item of the electronic file, which is pre-known in the knowledge base of the second node, on the basis of the received recipe of the electronic file; and executing, at the second node, a dynamic malware analysis on a runtime behavior of the reconstructed electronic file.

According to an example aspect of the present invention, there is provided an apparatus, comprising a memory configured to store computer program code, and a processor configured to read and execute computer program code stored in the memory, wherein the processor is configured to cause the apparatus to perform: A) comparing, at a first node, file items of an electronic file to be scanned for malware with the file items of previously scanned electronic files; B) in the event a previously scanned electronic file including a predetermined number of same file items as the electronic file to be scanned is found on the basis of the comparison, generating a recipe of the electronic file to be scanned; C) sending the generated recipe of the electronic file to be scanned for malware from the first node to a second node for enabling the second node to reconstruct the electronic file by assembling its file items on the basis of the obtained recipe and executing a dynamic malware analysis on a runtime behavior of the reconstructed electronic file, wherein said recipe includes at least information for: identification of one or more file items contained in the electronic file, identification of the previously scanned electronic file that was found and the result of the comparison of the electronic file to be scanned with the previously scanned electronic file; and D) receiving, at the first node, the result of the dynamic malware analysis.

According to an example aspect of the present invention, there is provided an apparatus, comprising means for comparing, at a first node, file items of an electronic file to be scanned for malware with the file items of previously scanned electronic files; means for generating a recipe of the electronic file to be scanned in the event a previously scanned electronic file including a predetermined number of same file items as the electronic file to be scanned is found on the basis of the comparison; means for sending the generated recipe of the electronic file to be scanned for malware from the first node to a second node for enabling the second node to reconstruct the electronic file by assembling its file items on the basis of the obtained recipe and executing a dynamic malware analysis on a runtime behavior of the reconstructed electronic file, wherein said recipe includes at least information for: identification of one or more file items contained in the electronic file, identification of the previously scanned electronic file including a predetermined number of same file items and that was found and the result of the comparison of the electronic file to be scanned with the previously scanned electronic file; and means for receiving, at the first node, the result of the dynamic malware analysis.

According to an example aspect of the present invention, there is provided an apparatus, comprising a memory configured to store computer program code, and a processor configured to read and execute computer program code stored in the memory, wherein the processor is configured to cause the apparatus to perform: receiving, at a second node, a recipe of an electronic file to be scanned for malware from a first node, said recipe including at least information for: identification of one or more file items contained in the electronic file, identification of a previously scanned electronic file including a predetermined number of same file items than the electronic file and that was found from a knowledge base of the first node, and a result of a comparison of the electronic file to be scanned with the previously scanned electronic file performed by the first node; reconstructing, at the second node, the electronic file by assembling its file items, including any file item of the electronic file, which is received from the first node, and any remaining file item of the electronic file, which is pre-known in the knowledge base of the second node, on the basis of the received recipe of the electronic file; and executing, at the second node, a dynamic malware analysis on a runtime behavior of the reconstructed electronic file.

According to an example aspect of the present invention, there is provided an apparatus, comprising means for receiving, at a second node, a recipe of an electronic file to be scanned for malware from a first node, said recipe including at least information for: identification of one or more file items contained in the electronic file, identification of a previously scanned electronic file including a predetermined number of same file items than the electronic file and that was found from a knowledge base of the first node, and a result of a comparison of the electronic file to be scanned with the previously scanned electronic file performed by the first node; means for reconstructing, at the second node, the electronic file by assembling its file items, including any file item of the electronic file, which is received from the first node, and any remaining file item of the electronic file, which is pre-known in the knowledge base of the second node, on the basis of the received recipe of the electronic file; and means for executing, at the second node, a dynamic malware analysis on a runtime behavior of the reconstructed electronic file.

According to further developments and/or modifications of any one of the aforementioned example aspects of the present invention, for example, one or more of the following can apply:

the operability may comprise performing a malware property query for the electronic file and the one or more file items contained in the electronic file, wherein the operations from A) to D) are initiated when the malware property query for at least one of the electronic file and the one or more file items contained in the electronic file yields a non-conclusive result, the recipe further includes at least one of: metadata having information for identification of the electronic file itself, list of metadata entries relating to content of the electronic file, secure hashes for identification, one or more file items of the electronic file, the operability may comprise receiving, from the second node, a request of at least one file item of the electronic file that is not pre-known in a knowledge base of the second node identified on the basis of the obtained recipe of the electronic file and sending the requested at least one file item to the second node for enabling the reconstructing of the electronic file, the operability may comprise identifying, at the first node, one or more file items previously unknown in a knowledge base of the first node and sending the identified one or more file items to the second node for enabling the reconstructing of the electronic file, a result of the dynamic malware analysis and/or a result of the static malware may be registered in the knowledge base, the comparing further comprises at least one of: calculating the differences between the content of electronic file to be scanned for malware and the content of the previously scanned electronic file, determining the smallest set of deletions and/or insertions to create one electronic file from the other, and displaying the result of the comparison, the operability may comprise receiving, from the second node, a request of at least one file item of the electronic file that is not pre-known in a knowledge base of the second node identified on the basis of the obtained recipe of the electronic file and sending the requested at least one file item to the second node for enabling the reconstructing of the electronic file, the metadata may further include information for identification of the electronic file itself, the information for identification may comprise a secure hash value, the knowledge base may comprise a database of a reputation service, and any information in the knowledge base indicates a reputation of a subject file item and/or a subject electronic file, such as clean, infected or potentially unwanted, the step of comparing may further comprise at least one of: calculating the differences between the file items of the electronic file to be scanned for malware and the file items of the previously scanned electronic file, determining the smallest set of deletions and/or insertions to create one electronic file from the other, and displaying the result of the comparison, the operability of considering if the previously scanned electronic file includes the predetermined number of the same file items as the electronic file to be scanned may further comprise calculating a similarity score based on the result of the comparison, the electronic file to be scanned may comprise a file of at least one of an Android Application Package (APK), a Portable Executable (PE), a Microsoft Soft Installer (MSI) or any other format capable of distributing and/or installing application software or middleware on a computer or a document container, the first node may comprise a malware scanning agent, the second node may comprise a malware scanning engine or application.

According to an example aspect of the present invention, there is provided a computer program product, comprising computer-executable computer program code which, when the computer program code is executed on a computer (such as or included in an apparatus according to any one of the aforementioned apparatus-related example aspects of the present invention), is configured to cause the computer to carry out a method according to the aforementioned method-related example aspect of the present invention, including any developments and/or a modifications thereof.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned example aspects of the present invention are set out herein with reference to the drawings and exemplifying embodiments of the present invention.

By way of exemplifying embodiments of the present invention, remote malware scanning is enabled, which is capable of reducing required traffic and bandwidth (and speeding up remote malware scanning) and/or impeding corruption of security and reliability.

BRIEF DESCRIPTION OF THE DRAWINGS

In the following, the present invention will be described in greater detail by way of non-limiting examples with reference to the accompanying drawings, in which.

DETAILED DESCRIPTION

Figure 1:
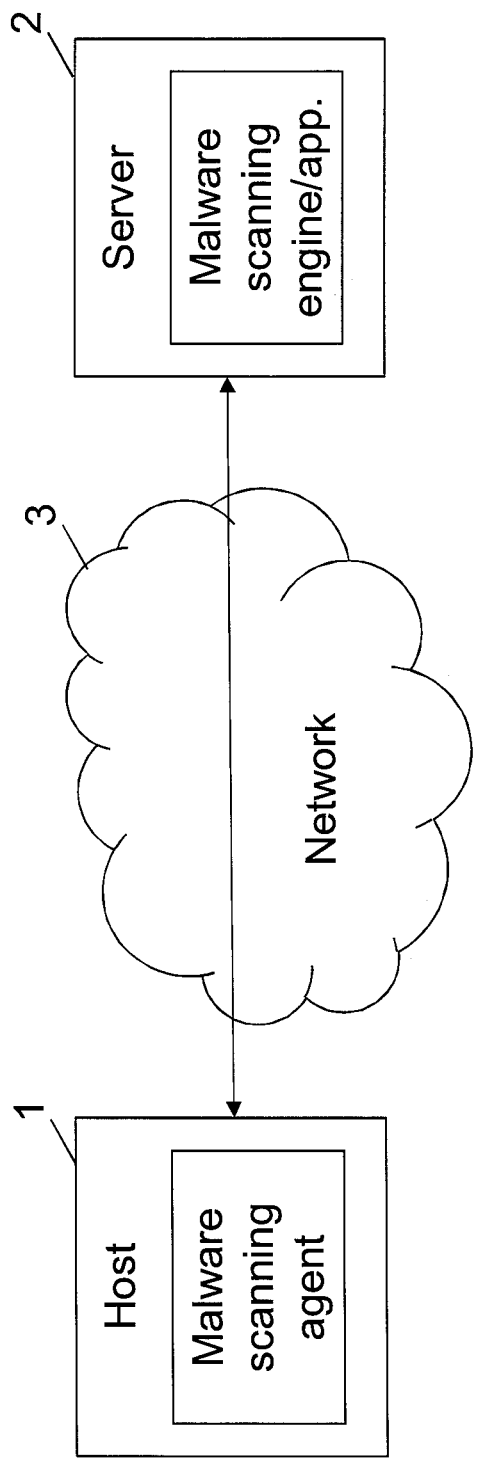
FIG. 1 shows a schematic diagram illustrating a system configuration, for which exemplifying embodiments of the present invention are applicable.

The present invention is described herein with reference to particular non-limiting examples and to what are presently considered to be conceivable embodiments of the present invention. A person skilled in the art will appreciate that the present invention is by no means limited to these examples, and may be more broadly applied.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for enabling resource-efficient remote malware scanning which is capable of executing static and dynamic file analysis for malware scanning, as described in more details below.

FIG. 1 shows a schematic diagram illustrating a system configuration, for which exemplifying embodiments of the present invention are applicable.

As shown in FIG. 1, exemplifying embodiments of the present invention generally relate to a system configuration in which a local entity or host 1 and a remote entity or server 2 are connected via a network 3. Here, the host 1 exemplifies any computer or communication system (including a single device or a combination of devices), on which malware scanning is to be performed (remotely at/by the server). For example, the host 1 may include a personal computer, a personal communication device, a network-enabled device, a client, a firewall, a mail server, a proxy server, a database server, or the like. The server 2 exemplifies any computer or communication system (including a single device or a combination of devices), on which malware scanning is performed (of/for the host 1). For example, the server 2 may include a security entity or a backend entity of a security provider, or the like, and the server 2 may be realized in a cloud implementation or the like.

According to exemplifying embodiments of the present invention, remote malware scanning of/for the host 1 at/by the server 2 can be realized using a malware scanning agent (such as e.g. a (lightweight) anti-virus client or the like) being installed/arranged at the host 1 (like e.g. an anti-virus client function) and a malware scanning engine or application being installed/arranged at the server 2 (like e.g. an anti-virus server function).

The network 3 exemplifies any computer or communication network, including e.g. a (wired or wireless) local area network like LAN, WLAN, Ethernet, or the like, a (wired or wireless) wide area network like WiMAX, GSM, UMTS, LTE, or the like, and so on. Hence, the host 1 and the server 2 can but do not need to be located at different locations. For example, the network 3 may be any kind of TCP/IP-based network. Insofar, communication between the host 1 and the server 2 over the network 3 can be realized using for example any standard or proprietary protocol carried over TCP/IP, and in such protocol the malware scanning agent at the host 1 and the malware scanning engine or application at the server 2 can be represented on/as the application layer.

First step in malware scanning of electronic files is to query reputations for the files and/or file items of the files and then make decisions based on the reputation data stored in a knowledge base (for example, in a security cloud reputation service or a local database). However, for totally new (unknown) files there are no entries in those databases. The unknown electronic files are usually uploaded to a security cloud and the lightweight anti-virus clients receive the results (for example, clean, infected, potentially unwanted) from the security cloud.

It is common that various software vendors update their applications every now and then which leads to a situation where basically all new versions of software applications will be uploaded to the security cloud even if there are only minor changes in the applications themselves. For example, a change of color/font in the applications will cause the application appear totally new for a security perspective. This is because, for example, SHA 1 checksums may be used to identifying the files. The same applies to all self-contained applications and file formats as many file items of the files are reused but as the file itself is a compressed contained, it may look totally new and for example a binary diff is not usually effective in minimizing transport requirements. For example, Android application package (APK) itself is a zip file containing all the files that are included in the application. This means that compiled source code, icons, texts, third party libraries, certificates etc. are included in the APK. Usually the knowledge base of a security server has samples for some of many file items of the APK files but the APK file is still uploaded as a whole file to the server. Especially common, fairly large libraries are contributing a significant portion of the size of an APK.

All this leads to a situation where a lot of samples of the same files are stored in the knowledge base of a security service backend and clients/hosts keep sending more and more. This all causes extra bandwidth usage for users using the clients and for the security server. Further this causes problems due to unreliable mobile networks since users may have to try uploading a file to the security server for several times before success.

The embodiments of the invention aim to minimize the amount of data that is required to be sent to the security server for static scanning and behavioral analysis. This saves bandwidth from end users and from the backend/cloud side.

It also makes malware scanning faster and prevents sending multiple copies of same files into the security cloud for scanning. Further the scanning operations may run smoother even when there are network connections problems. Thus, both bandwidth and time can be saved by preventing uploading redundant files to the security cloud but yet analyzing behavior of the application is enabled instead of just relying on static analysis of the application components.

When an application version A is installed, an lightweight malware scanning agent of an apparatus may scan the whole package and the file items inside it. The client may store the details of each application package including the package structure (file names, paths) and secure hash values, e.g. SHA1 checksums. When the application is updated to a version B, the lightweight malware scanning agent in the apparatus may compare first what has changed from the version A and queries reputations for the new parts. In case something unknown is detected and the client cannot make a decision if the package is clean or not, the client constructs a comparison result compared with the previous version. The client may then send the result, identification details of the previous package (version A) and possibly also the new files in the package version B to the security cloud server. The scanning service in the security cloud can then construct the whole package based on data that the client has sent and analysis can be performed.

Figure 2:
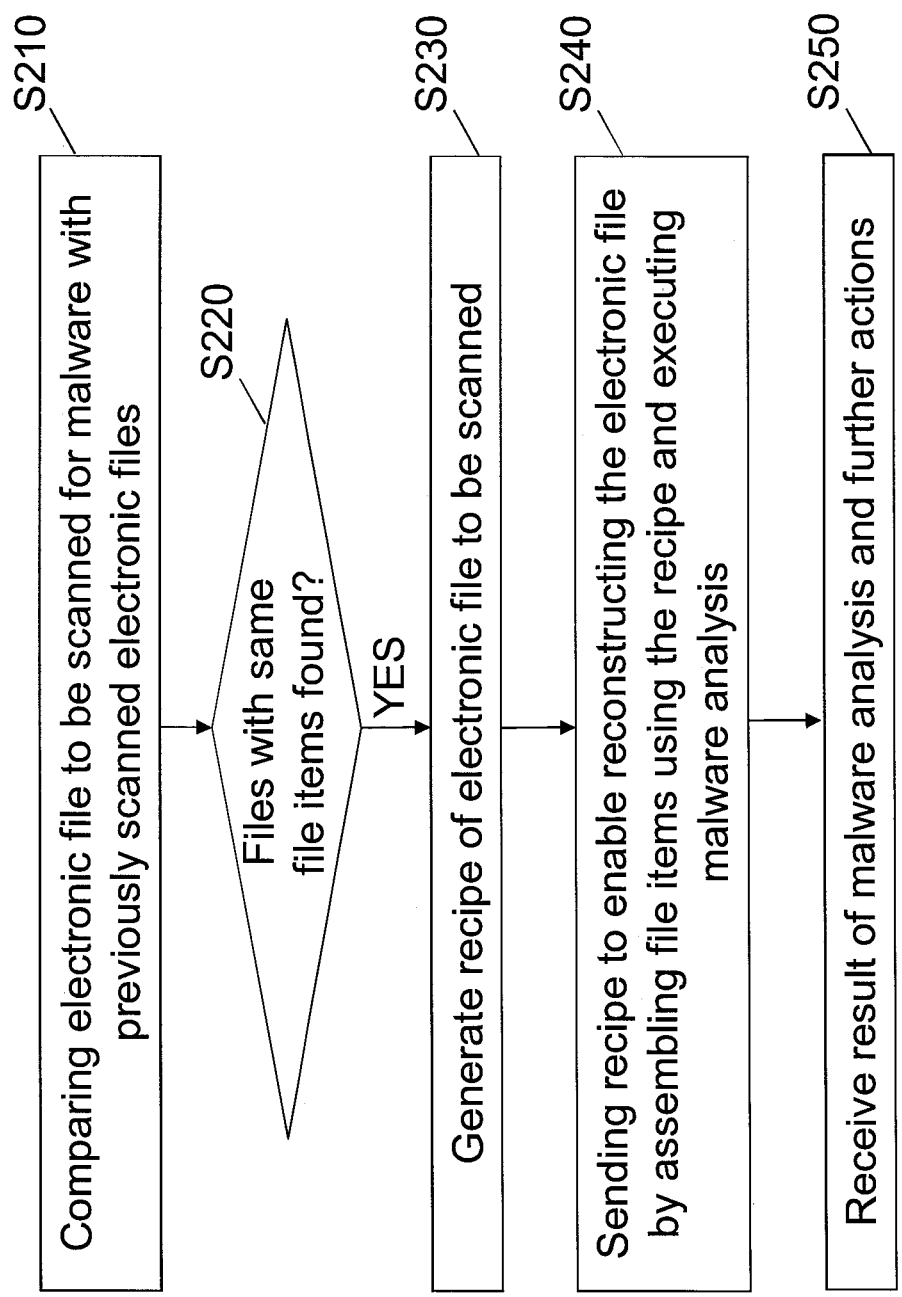
FIG. 2 shows a flowchart illustrating an example of a method, operable at a local entity (host), according to exemplifying embodiments of the present invention.

FIG. 2 shows a flowchart illustrating an example of a method, operable at a first node, according to exemplifying embodiments of the present invention. The illustrated method is for example operable at the local entity or host as illustrated in FIG. 1 (e.g. by or using the malware scanning agent thereof).

As shown in FIG. 2, a method according to exemplifying embodiments of the present invention, which is operable at a first node such as a local entity or host, and which could be referred to as method of remote malware scanning, comprises an operation S210 of comparing an electronic file to be scanned for malware with previously scanned electronic files. In 220 it is determined whether any previously scanned electronic files including a predetermined number of same file items as the electronic file are found on basis of the comparison. In the event a previously scanned electronic file considered to include a predetermined number of same file items as the electronic file to be scanned is found, then S230 is entered where a recipe of the electronic file to be scanned is generated.

In S240 the generated recipe of the electronic file to be scanned for malware is sent from the first node to a second node for enabling the second node to reconstruct the electronic file by assembling its file items on the basis of the obtained recipe and to execute a dynamic malware analysis on a runtime behavior of the reconstructed electronic file. In S250, the result of the dynamic malware analysis is received at the first node.

In an embodiment, the generated recipe includes at least information for: identification of one or more file items contained in the electronic file, identification of a sufficiently similar previously scanned electronic file that was found and the result of the comparison of the electronic file to be scanned with the previously scanned electronic file. The generated recipe may further include any of: metadata having information for identification of the electronic file itself, list of metadata entries relating to content of the electronic file, secure hashes for identification, one or more file items of the electronic file. In an embodiment, it is possible that the identified one or more file items that are determined to be different on the basis of the comparison are also sent with/included in the generated recipe.

In an embodiment, the step of comparing further comprises at least one of: calculating the differences between the file items of the electronic file to be scanned for malware and the file items of the previously scanned electronic files, determining the smallest set of deletions and/or insertions to create one electronic file from the other, and displaying the result of the comparison. Considering if any of the previously scanned electronic files include a predetermined number of same file items as the electronic file to be scanned or are sufficiently similar to the electronic file to be scanned may further comprise calculating a similarity score based on the result of the comparison. Any other methods can also be used to determine whether the contents of the electronic files include enough same file items. For example, if a similarity score is used, then a threshold may be predetermined that is required to be reached for achieving the required sufficiency of similarity. For example, in an embodiment it may be required that the previously scanned electronic file includes at least one same file item than the electronic file to be scanned.

In an embodiment, a malware property query for the electronic file and the one or more file items contained in the electronic file is performed and the operations from S210 to S250 are initiated when the malware property query for at least one of the electronic file and the one or more file items contained in the electronic file yields a non-conclusive result.

According to exemplifying embodiments of the present invention, the electronic file to be scanned for malware can be any electronic file, particularly encompassing any electronic file including a runnable/executable part, such as any kind of application file. Insofar, exemplifying embodiments of the present invention are applicable to any such electronic file, including for example a file of an Android Application Package (APK), a Portable Executable (PE), a Microsoft Soft Installer (MSI) or any other format capable of distributing and/or installing application software or middleware on a computer. The electronic file referred to herein may be understood as sort of file container with (un-/compressed) files representing file items thereof, or may equally be understood as sort of file with (un-/compressed) portions representing file items thereof.

Figure 3:
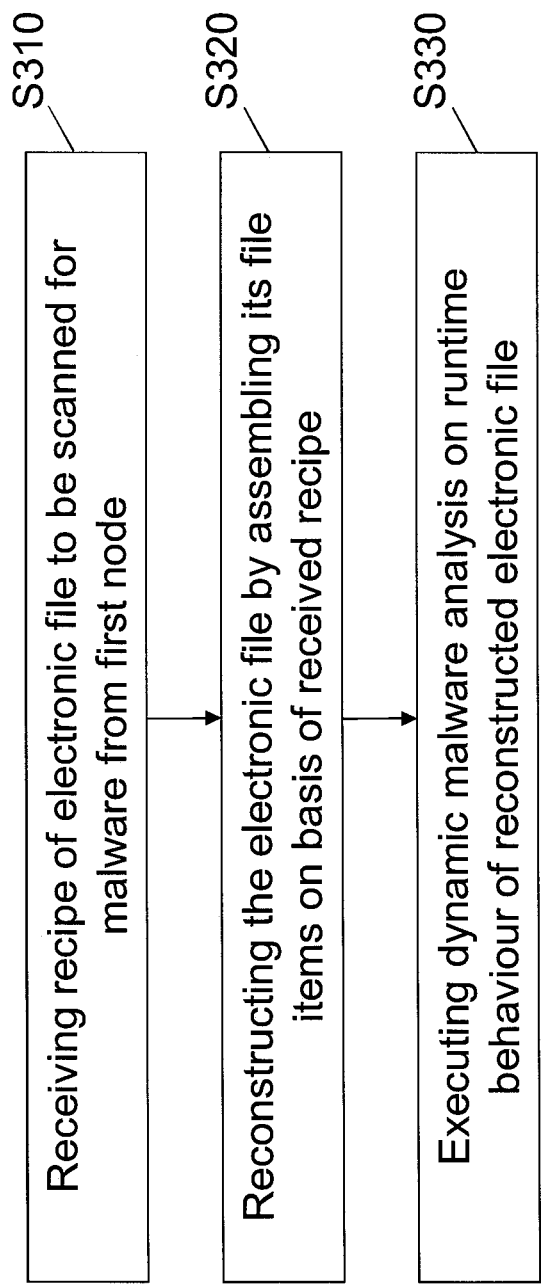
FIG. 3 shows a flowchart illustrating an example of a method, operable at a remote entity (server), according to exemplifying embodiments of the present invention.

FIG. 3 shows a flowchart illustrating an example of a method, operable at a second node, according to exemplifying embodiments of the present invention. The thus illustrated method is for example operable at the remote entity or server as illustrated in FIG. 1 (e.g. by or using the malware scanning engine or application thereof).

As shown in FIG. 3, the method according to exemplifying embodiments of the present invention comprises an operation S310 of receiving, at a second node, a recipe of an electronic file to be scanned for malware from a first node. The recipe includes at least information for: identification of one or more file items contained in the electronic file, identification of a sufficiently similar previously scanned electronic file including a predetermined number of same file items as the electronic file and that was found from a knowledge base of the first node, and a result of a comparison of the electronic file to be scanned with the previously scanned electronic file performed by the first node. In this example, the identified missing or changed file items are also sent to the server with/within the recipe. The method further comprises an operation S320 of reconstructing, at the second node, the electronic file by assembling its file items, including any file item of the electronic file, which is received from the first node, and any remaining file item of the electronic file, which is pre-known in the knowledge base of the second node, on the basis of the received recipe of the electronic file, and an operation S330 of executing, at the second node, a dynamic malware analysis on a runtime behavior of the reconstructed electronic file.

According to exemplifying embodiments of the present invention, it is assumed that the second node has or has access to a knowledge base usable for malware scanning. The knowledge base stores (a pointer to and/or copy of) any file item (and potentially also any file) which has previously been subject to malware scanning at the second node (or which has previously been subject to malware scanning at another node which reported the result thereof to the second node), and/or information on a malware property (corresponding to a malware scanning result) of any such file item (and potentially also any file). That is, the knowledge base includes information regarding malware scanning for any file item (or file) which is known at the second node or, more specifically, the malware property of which is known at the second node. For example, the knowledge base may comprise a database of a reputation service, and any information in the knowledge base indicates a reputation of a subject file item, such as clean, infected or potentially unwanted (e.g. PUA: potentially unwanted application). The knowledge base may be queried by using any arbitrary identification of file items (or files). For example, a secure hash value, e.g. a SHA1 checksum, of a file item (or file) may be used for identification/query purposes, and the metadata described herein thus includes corresponding information for identification of one or more file items contained in the electronic file, which is suitable for identification/query purposes for the knowledge base.

If at least one file item is identified as being not pre-known in the knowledge base of the second node, which means that the second node does not have available all information/data required for reconstructing the electronic file, in an embodiment the method further comprises an operation sending (transferring) an instruction indicating the identified at least one file item of the electronic file from the second node to the first node (i.e. an operation of instructing delivery (transfer) of the identified at least one file item). This instruction serves to acquire any previously unavailable information/data required for reconstructing the electronic file so as to enable reconstruction of the electronic file. If no file item is identified as being not pre-known in the knowledge base of the second node, which means that the second node has available all information/data required for reconstructing the electronic file, no such instruction is sent (transferred) from the second node to the first node. Then, the method proceeds with a malware scanning operation.

According to exemplifying embodiments of the present invention, the malware scanning of the electronic file at the remote entity particularly involves dynamic malware analysis, but may also involve static malware analysis, on the basis of the (i.e. all (relevant) file items of the electronic file, namely any file item which is obtained from the first node in response to the instruction for delivery (also referred to as the previously unknown file items) and any remaining which is pre-known in the knowledge base of the second node (also referred to as previously known file items)).

According to exemplifying embodiments of the present invention, (a copy of) all (relevant) file items for dynamic (and static) malware analysis will eventually be in the possession of the remote entity.

For the dynamic malware analysis, the electronic file is reconstructed by assembling the previously unknown file items and the previously known file items on the basis of the recipe of the electronic file, which is obtained from the first node, and a dynamic malware analysis on a runtime behavior of the reconstructed electronic file is executed for the thus the reconstructed electronic file.

For the static malware analysis, the individual file items of the electronic file to be scanned for malware are used. More specifically, for the previously known file items (for which information is already stored in the knowledge base), a result of a static malware analysis can be retrieved from the knowledge base, and, for the previously unknown file items (for which no information is already stored in the knowledge base), a static malware analysis can be executed so as to obtain a result of a static malware analysis.

Figure 4:
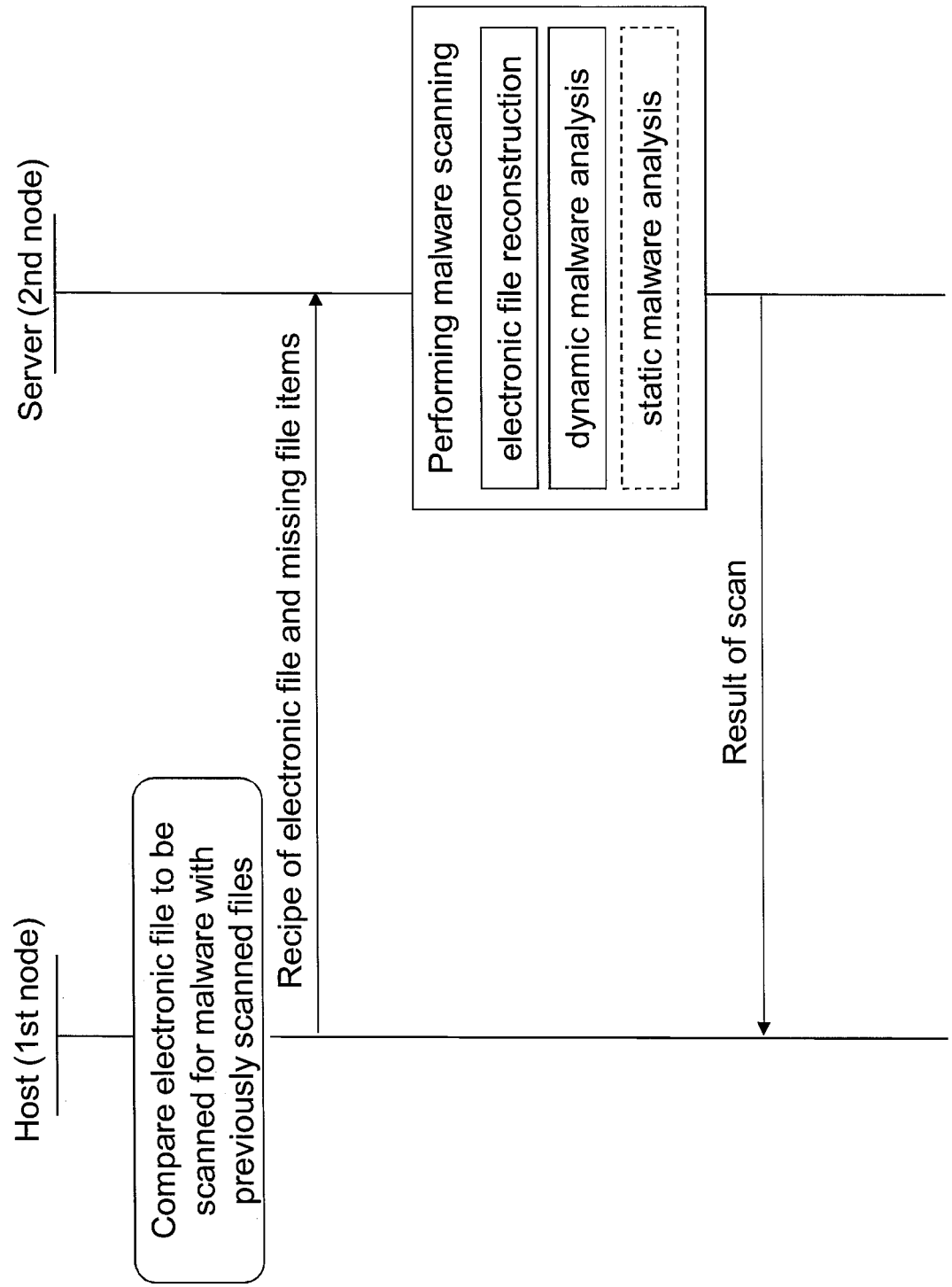
FIG. 4 shows a diagram illustrating an example of a procedure of remote malware scanning according to exemplifying embodiments of the present invention.

FIG. 4 shows a diagram illustrating an example of a procedure of remote malware scanning according to exemplifying embodiments of the present invention.

Basically, FIG. 4 illustrates the cooperation or interrelation between the operation of the first node, i.e. the method of/at the host illustrated in FIG. 2, and the operation of the second node, i.e. the method of/at the server illustrated in FIG. 3. Accordingly, reference is made to the above description of FIGS. 2 and 3 for details.

Figure 5:
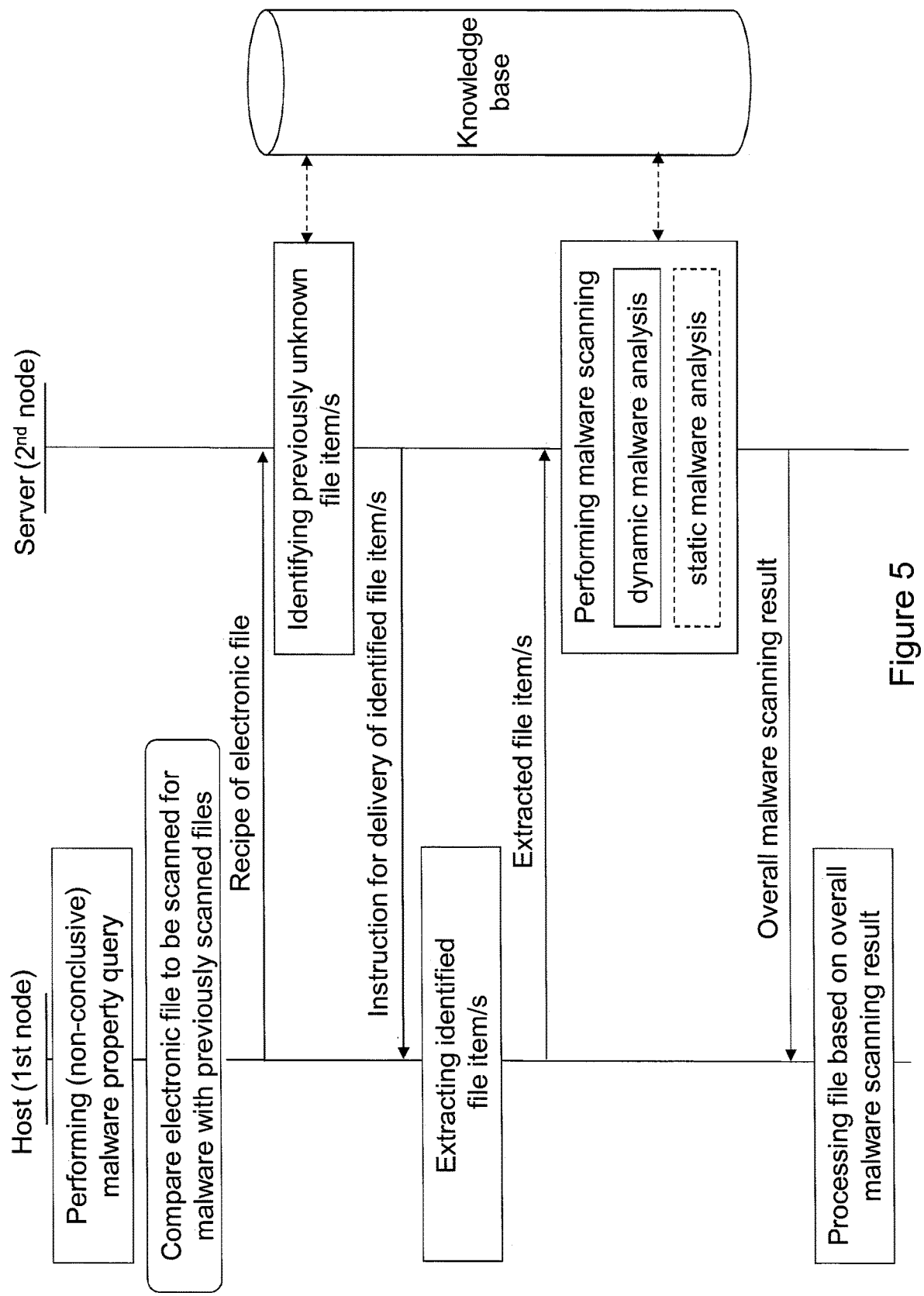
FIG. 5 shows a diagram illustrating another example of a procedure of remote malware scanning according to exemplifying embodiments of the present invention.

FIG. 5 shows a diagram illustrating another example of a procedure of remote malware scanning according to exemplifying embodiments of the present invention.

Basically, FIG. 5 illustrates, by way of lines, arrows and blocks, various optional operations in the procedure of FIG. 4, which are independently useful, and which can be individually incorporated in the procedure of FIG. 4 independent from each other. Further, FIG. 5 schematically illustrates a knowledge base accessible by the second node, wherein the knowledge base, as indicated above, may for example be a database of a reputation service, which may be located locally or remotely with respect to the second node.

As illustrated in FIG. 5, the following operations, variants or implementations are practicable.

At the start of the above-described procedure, the first node may perform a malware property query for the electronic file and the one or more file items contained in the electronic file. Such malware property query may be a reputation query at a reputation database, such as the knowledge base of the second node. Then, the above-described procedure, including the respective operations at the first and second nodes, as illustrated in any one of FIGS. 4 and 5, are initiated when the malware property query (reputation query) for at least one of the electronic file and the one or more file items contained in the electronic file yields a non-conclusive result. Otherwise, the above-described procedure can be skipped, and the conclusive result of the malware property query (reputation query) may be used as or for constructing a malware scanning result with respect to the electronic file, and processing of the electronic file may be based on such malware scanning result.

In the operation of identifying the at least one file item (which is not pre-known at the second node and thus has to be requested for enabling malware scanning of the electronic file at the second node), the second node may utilize the knowledge base. More specifically, the second node may check the knowledge base for presence of information on the one or more file items contained in the electronic file, for which information for identification is included in the metadata delivered by the first node. Accordingly, such check may be performed with the knowledge base on the basis of the obtained metadata of the electronic file. Based on such check, the second node may determine, as the identified at least one file item of the electronic file, all of the one or more file items subject to the knowledge base checking, for which no information is present in the knowledge base. That is, any file item, for which no (relevant or conclusive) information can be retrieved in the knowledge base, is identified as previously unknown file item.

In the operation of performing malware scanning, although not illustrated in FIG. 5, the second node reconstructs the electronic file by assembling any file item of the electronic file, which is obtained from the first node in response to the delivery instruction, if any, and/or any remaining file item of the electronic file, which is pre-known in the knowledge base of the second node, if any, on the basis of the obtained recipe of the electronic file. That is, the second node gathers all of the (relevant) file items of the electronic file from the knowledge base (as regards the previously known file items) and the present delivery by the first node (as regards the previously unknown file items), and constructs/assembles the electronic file using the thus gathered file items. The thus constructed/assembled electronic file is runnable/executable, and the second node then executes a dynamic malware analysis on a runtime behavior of the reconstructed electronic file by running/executing the thus constructed/assembled electronic file.

In the operation of performing malware scanning, the second node may execute a static malware analysis of any one of any file item of the electronic file, which is obtained from the first node in response to the delivery instruction, i.e. for the previously unknown file items, if any, and/or retrieve a result of a static malware analysis of any remaining file item of the electronic file, which is pre-known in the knowledge base of the second node, from the knowledge base, i.e. for the previously known file items, if any. In an embodiment, it is also possible that the first node sends some or all of the unknown file items with the recipe. Thus, it may not be necessary for the second node to request any or all of the previously unknown file items from the first node separately.

In the operation of performing malware scanning, the second node may construct an overall malware scanning result of the electronic file on the basis of the results of the malware analysis of any one of the reconstructed electronic file, the at least one file item of the electronic file, which is obtained from the first node in response to the instruction, and the remaining at least one file item of the electronic file, which is pre-known in the knowledge base of the second node, i.e. the individual results of the static and dynamic malware analyses. The second node may then register (store) the overall malware scanning result of the electronic file in the knowledge base and/or deliver (transfer) the overall malware scanning result of the electronic file to the first node.

In the operation of performing malware scanning, i.e. as a result of the malware scanning, the second node may register (store) a result of the dynamic malware analysis of the reconstructed electronic file and/or a result of the static malware analysis of any one of the at least one file item of the electronic file, which is obtained from the first node in response to the instruction, is registered in the knowledge base.

At the end of the above-described procedure, the first node may obtain (receive) an overall malware scanning result of the electronic file from the second node, and may process the electronic file based on such overall malware scanning result. For example, the electronic file, that is determined not to be safe, may be isolated, deleted or prevented from harming the host in any way.

In the following, a non-limiting exemplary use case according to exemplifying embodiments of the present invention will be described for explanatory purposes, with reference to the exemplary procedure of FIG. 5 (while it is noted that corresponding operations are equally practicable in the procedure of FIG. 4 as well).

For such exemplary use case, it is exemplarily assumed that the electronic file to be scanned for malware is an APK file version B including two file items f1 and f2. Among the APK file items, (a copy of/checksum of) file f1 is registered in the knowledge base of the host and server (i.e. file f1 is a previously known file item of the subject APK file for the host and the server), and (a copy of) file f2 is not registered in the knowledge of the host and server (i.e. file f2 is a previously unknown file item of the APK file for the host and server). The reasons for file f2 being not pre-known at the host and server may be manifold, e.g. that file f2 has been updated or otherwise changed/modified or has been tampered since the preceding malware scan of the APK file. Further, it is exemplarily assumed that any file or file item is identified by its SHA1 checksum representing a non-limiting example of a secure hash value.

Initially, the host (e.g. an Android lightweight malware scanning agent at the host) may calculate SHA1 checksums for all (relevant) files inside the APK file (e.g. files f1 and f2), and query (look up) reputations for the whole APK file and the files of the APK file. In case the decision on reputation, i.e. whether the whole APK file and the files of the APK file are clean or malware, cannot be made in a conclusive manner by way of such reputation query (lookup), the host initiates the further procedure as described below.

The host compares the APK file version B to previously scanned APK files (data of which being stored in the knowledgebase of the host). The comparison may be based on any data that is stored related to the previously scanned APK files. For example details of application package including package structure (file names, paths) and SHA1 checksums may be used for the comparison.

If a sufficiently similar previously scanned APK file/APK file having enough same file items (one or more), an APK file version A in this case, is found, then the host generates a recipe including at least information for: identification of one or more file items contained in the electronic file (APK version B), identification of the previously scanned electronic file that was found (APK version A) and the result of the comparison of the electronic files (APK version B and APK version A). The host sends this recipe to the server. Also the missing/changed file items may be sent to the server at the same time. The difference between the two APK files in this example case was the file f2 that was for example missing or changed in the APK file version A when compared with the APK file version B.

In this regard, it is assumed that the server knows or gets to know that the APK file version B, for which the recipe is sent from the host, is to be scanned for malware. Such knowledge may be given in any conceivable manner, either implicitly (e.g. by the mere reception of metadata from a (potentially registered) host and/or for a (potentially) malware-susceptible file) or explicitly (e.g. by a corresponding indication in or before the transmission of the metadata).

The server may also receive the APK metadata for files f1 and/or f2 (and the APK file). Based thereon, the server may check the knowledge base and determine that file f1 is registered and thus known, while file f2 is not registered and thus unknown. Hence, file f2 is identified as a previously unknown file item, i.e. a file item which is not pre-known and is thus missing for enabling malware scanning of the overall APK file.

Based on the metadata of the APK file, the server may check the knowledge base and determine whether (a copy of) the APK file itself is registered or not. If the APK file itself is not registered, this may be due to the fact that it is a new APK file or a previously known APK file has been changed. These cases may be differentiated using the APK metadata for its files, e.g. files f1 and f2. For a new APK file, all file items are previously unknown file items. For a changed APK file, only the changed file items are previously unknown file items. For example, when a previously known APK file has been changed by deletion of one of more file items, this can be recognized using the recipe of the APK file (and the APK metadata for its files, e.g. files f1 and f2), delivery of missing file item/s for enabling malware scanning of the overall APK file is only caused, if any one of the still included file item/s is identified as a previously unknown file item. It is also possible that the missing file item/s are delivered with the recipe sent from the host to the server regardless of whether the file item/s are pre-known by the server.

In the present exemplary use case, as the server cannot perform malware scanning, thus being unable to make a decision on the malware property of the APK file, on the basis of the available information, the server requests provision of the missing information. In this case, the server instructs the host to deliver the missing file item/s, namely file f2. To this end, the server sends a corresponding instruction to the host, which may be regarded as a command or directive for extracting the missing file item/s from the APK file or as a recipe of/for the APK file to be (re-) constructed/assembled.

In response to such request or instruction from the server, the host extracts the APK file accordingly. More specifically, the host extracts the requested missing file item/s, namely file f2, from the APK file, and send the thus extracted file item/s, namely file f2, back to the server, in accordance with the command/directive or recipe from the server. At this point, (relevant) metadata of or relating to the thus delivered file item/s, namely file f2, can also be provided. It is noted that, according to certain constraints, the host may deliver only a subset of requested missing file item/s to the server.

Upon receipt of the requested missing file item/s, namely file f2, the server performs malware scanning of the APK file. Namely, the server now has available all required information/data, namely (copies of) files f1 and f2 (and related metadata and recipe). Based thereon, the server (re-)constructs/assembles the APK file using the meanwhile available files f1 and f2 in connection with the accompanying recipe, and executes a dynamic malware analysis on a runtime behavior of the reconstructed APK file. The thus (re-)constructed/assembled APK file corresponds to the (original) APK file to be scanned for malware, at least as far as expedient for performing appropriate malware scanning. That is, the (re-)constructed/assembled APK file may be identical or at least similar to the (original) APK file in that a potential difference resides only in irrelevant/negligible points such as signature/s, date/s or the like. Also, the server may perform static malware analysis for the individual files of the APK file, in the present case including e.g. execution of a static malware analysis of/for previously unknown file f2, and retrieval of for previously known file f1 from the knowledge base.

As a result of the thus performed malware scanning, the server may register the result of the dynamic malware analysis of the APK file and/or the result of the static malware analysis of the file f2 in the knowledge base, since such results for this file and this file item are newly derived. Also, the server may construct an overall malware scanning result for the APK file (and its files f1 and f2), and sent this overall malware scanning result to the host, where the overall malware scanning result may be used for the further processing of the APK file.

For example, if file f2 is assessed as being infected and/or the reconstructed APK file is assessed as exhibiting an infected or suspicious behavior, the server may register and inform the host that file f2 is infected and/or the APK file exhibits infected or suspicious behavior, or—in a summary—that the APK file is infected or suspicious, i.e. not clean. Incidentally, the server may assess that file f1 as being infected already upon initial reception of the APK metadata (on the basis of a query of the knowledge base, if such query yields that file f1 is infected); in such case, the subsequent operations up to the and including the malware scanning may be skipped, and a corresponding (negative) overall malware scanning result may be constructed and provided accordingly.

In view of the above illustration of procedures, it is noted that any block may represent a single or multiple operations, and that any arrow may represent a single or multiple transmissions or operations. For example, although a single transmission of receipt and a single transmission of extracted file item/s are illustrated in FIGS. 4 and 5, the receipt and the extracted file item/s may also be transmitted in more than one transmission, respectively.

By virtue of exemplifying embodiments of the present invention, as described above, resource-efficient remote malware scanning is enabled, which is capable of executing static and dynamic file analysis for malware scanning.

In a nutshell, the technical effects of exemplifying embodiments of the present invention can be achieved as follows.

Resource efficiency can be achieved in that initially only a recipe for a file to be malware-scanned is transmitted and subsequently only the missing file item/s is/are transmitted (rather than initially transmitting the entire file to be malware-scanned). Resource efficiency can also be achieved in that only actually required data is transmitted, stored and processed (rather than requiring the handling of multiple copies of the same data in various executions of the same procedure).

Capability of executing dynamic (and static) file analysis for malware scanning, i.e. a comprehensive malware scan of the file to be malware-scanned, can be achieved in that recipe of the file to be malware-scanned, enabling not only static but also dynamic (behavioral or runtime) analysis, is eventually available at the remote malware scanning entity and the host already has knowledge on how the file has been changed before generating the recipe.

Accordingly, exemplifying embodiments of the present invention are able to minimize the amount of data sent via a network for static scanning and behavioral analysis, and/or to save bandwidth from end user's (host's) and security provider's (server's) perspective, and/or to reduce time, computational and/or storage requirements for remote malware scanning. Specifically, it can be said that exemplifying embodiments of the present invention can save bandwidth, time and processing load by preventing uploading and processing redundant files to the remote malware scanning entity, yet still being able to analyze behavior of the file (e.g.

the application) instead of relying only on static analysis of the components of the file (e.g. the application).

The technical effects of exemplifying embodiments of the present invention are generally beneficial for remote malware scanning of any tape of electronic file, especially any electronic file configured for or capable of distributing and/or installing application software or middleware on a computer. Stated in other words, exemplifying embodiments of the present invention are specifically effective for any electronic file including at least one runnable/executable file item, since a dynamic (behavioral) analysis is typically expedient for such type of electronic file (and such dynamic (behavioral) analysis can oftentimes not be accomplished at by a (lightweight) malware scanning agent of e.g. a mobile device).

The technical effects of exemplifying embodiments of the present invention are particularly beneficial for files or file types/formats subject to frequent changes (of minor extent). This is for example the case for APK files. Namely, e.g. for Android-running mobile devices, software vendors update their applications every now and then, and this leads to a situation that basically all new versions of applications would conventionally be uploaded to a remote malware scanning entity even if there is only a minor change in the application itself. For example, a change in an application's colors/fonts, etc. makes that application look new when e.g. using a secure hash values such as SHA1 checksums for file and file item identification. Accordingly, the entire APK file would conventionally have to be uploaded and subject to remote malware scanning again every time, but only the actually changed/modified part thereof is sufficient to be uploaded and subject to remote malware scanning with embodiments of the present invention.

Especially, certificates and fairly large libraries are commonly contributing a significant portion of APK size, and upload and processing thereof can be avoided with embodiments of the present invention. This applies to all self-contained application and file formats, as many parts thereof are typically reused, and embodiments of the present invention facilitate handling of only the changed part/s, including e.g. updated part/s, tampered part/s or otherwise changed/modified part/s.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, nodes and systems, including both software and/or hardware thereof.

Respective exemplifying embodiments of the present invention are described below referring to FIG. 6, while for the sake of brevity reference is made to the detailed description of respective corresponding configurations/setups, schemes, methods and functionality, principles and operations according to FIGS. 1 to 5.

Figure 6:
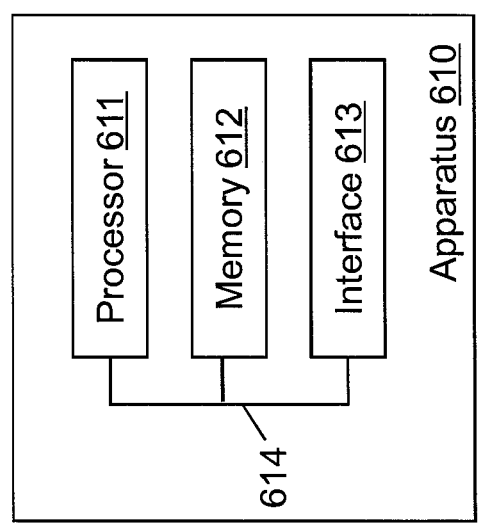
FIG. 6 shows a schematic diagram illustrating an example of a structure of an apparatus according to exemplifying embodiments of the present invention.

In FIG. 6, the solid line blocks are basically configured to perform respective methods, procedures and/or functions as described above. The entirety of solid line blocks are basically configured to perform the methods, procedures and/or functions as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIG. 6, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories, a display, or the like. Among others, one or more memories are provided for storing programs or program instructions for controlling or enabling the individual functional entities or any combination thereof to operate as described herein in relation to exemplifying embodiments.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated devices/apparatuses are suitable for use in practicing one or more of the exemplifying embodiments of the present invention, as described herein.

FIG. 6 shows a schematic diagram illustrating an example of a structure of an apparatus according to exemplifying embodiments of the present invention.

As indicated in FIG. 6, an apparatus 610 according to exemplifying embodiments of the present invention may comprise at least one processor 611 and at least one memory 612 (and possibly also at least one interface 613), which may be operationally connected or coupled, for example by a bus 614 or the like, respectively.

The processor 611 of the apparatus 610 is configured to read and execute computer program code stored in the memory 612. The processor may be represented by a CPU (Central Processing Unit), a MPU (Micro Processor Unit), etc., or a combination thereof. The memory 612 of the apparatus 610 is configured to store computer program code, such as respective programs, computer/processor-executable instructions, macros or applets, etc. or parts of them. Such computer program code, when executed by the processor 611, enables the apparatus 610 to operate in accordance with exemplifying embodiments of the present invention. The memory 612 may be represented by a RAM (Random Access Memory), a ROM (Read Only Memory), a hard disk, a secondary storage device, etc., or a combination of two or more of these. The interface 613 of the apparatus 610 is configured to interface with another apparatus and/or the user of the apparatus 610.

That is, the interface 613 may represent a communication interface (including e.g. a modem, an antenna, a transmitter, a receiver, a transceiver, or the like) and/or a user interface (such as a display, touch screen, keyboard, mouse, signal light, loudspeaker, or the like).

The apparatus 610 may, for example, represent a (part of a) first node, such as local entity or host 1 in FIG. 1, or may represent a (part of a) second node, such as remote entity or server 2 in FIG. 1. The apparatus 610 may be configured to perform a procedure and/or exhibit a functionality as described in any one of FIGS. 2 to 5.

When representing a (part of a) first node, such as local entity or host 1 in FIG. 1, the apparatus 610 or its processor 611 (possibly together with computer program code stored in the memory 612), in its most basic form, is configured to generate a recipe of an electronic file to be scanned for malware to a second node, said recipe including at least information for: identification of one or more file items contained in the electronic file, identification of the previously scanned electronic file including a predetermined number of same file items than the electronic file and that was found on basis of the comparison, and the result of the comparison of the electronic file to be scanned with the previously scanned electronic file, and to send the recipe to the second node for enabling the second node to reconstruct the electronic file by assembling its file items, including any file item of the electronic file, which is delivered by the first node in response to the instruction, and any remaining file item of the electronic file, which is pre-known in the knowledge base of the second node, on the basis of the obtained metadata of the electronic file.

When representing a (part of a) second node, such as remote entity or server 2 in FIG. 1, the apparatus 610 or its processor 611 (possibly together with computer program code stored in the memory 612), in its most basic form, is configured to receive a recipe of an electronic file to be scanned for malware from a first node, said recipe including at least information for: identification of one or more file items contained in the electronic file, identification of a previously scanned electronic file including a predetermined number of same file items than the electronic file and that was found from a knowledge base of the first node, and a result of a comparison of the electronic file to be scanned with the previously scanned electronic file performed by the first node, to reconstruct the electronic file by assembling its file items, including any file item of the electronic file, which is received from the first node, and any remaining file item of the electronic file, which is pre-known in the knowledge base of the second node, on the basis of the received recipe of the electronic file; and to execute a dynamic malware analysis on a runtime behavior of the reconstructed electronic file.

Accordingly, any one of the above-described schemes, methods, procedures, principles and operations may be realized in a computer-implemented manner.

Any apparatus according to exemplifying embodiments of the present invention may be structured by comprising respective units or means for performing corresponding operations, procedures and/or functions. For example, such means may be implemented/realized on the basis of an apparatus structure, as exemplified in FIG. 6 above, i.e. by one or more processors 611, one or more memories 612, one or more interfaces 613, or any combination thereof.

For further details regarding the operability/functionality of the individual elements according to exemplifying embodiments of the present invention, reference is made to the above description in connection with any one of FIGS. 1 to 5, respectively.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset;

this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling resource-efficient remote malware scanning capable of static and dynamic file analysis. Such measures could exemplarily comprise, at a remote entity, obtaining metadata of an electronic file to be scanned for malware, said metadata including at least information for identification of one or more file items contained in the electronic file, identifying whether at least one file item of the electronic file is not pre-known at the remote entity, instructing delivery of any identified at least one file item of the electronic file, reconstructing the electronic file by assembling its file items, including any file item of the electronic file, which is not pre-known at the remote entity, and any remaining file item of the electronic file, which is pre-known at the remote entity, on the basis of the obtained metadata of the electronic file, and executing a dynamic malware analysis on a runtime behavior of the reconstructed electronic file.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

The invention claimed is:

1. A method of remote malware scanning, the method comprising:
   A) comparing, at a first node, one or more file items of a first electronic file version of an electronic file to be scanned for malware with a previously scanned electronic file version of a knowledge base of the first node, wherein the comparing is using a list of metadata entries identifying for a knowledge base at least one registered file of the one or more file items of the first electronic file version for scanning;
   B) generating a recipe for one or more file items of the first electronic file version to be scanned, wherein the generating is based on a result of the comparing each of the at least one registered file of the one or more file items of the first electronic file version against the previously scanned electronic file version of the knowledge base to at least identify at least one file item that is determined to be missing from the previously scanned electronic file, and identifying that the at least one registered file of the first electronic file version has a predetermined number of same or similar file items to achieve a required sufficiency of similarity based on a threshold;
   C) based on the threshold, sending from the first node to the second node the generated recipe of the first electronic file version comprising the information and the indication of the at least one registered file for retrieval from the database and an indication of the at least one file item determined to be missing from the one or more file items of the first electronic file version for enabling the second node to reconstruct based on the recipe the predetermined number of changed file items and same or similar file items including the at least one file item determined to be missing to be runnable on a basis of the generated recipe; and
   D) receiving, at the first node, a result of the dynamic malware analysis of the one or more file items including the at least one file item of the first electronic file version determined to be missing reconstructed to be runnable indicating it is infected with malware.

2. The method according to claim 1, further comprising:
   performing a malware property query for the first electronic file version and the one or more file items contained in the first electronic file version,
   wherein the operations from A) to D) are initiated when the malware property query for at least one of the first electronic file version and the one or more file items contained in the first electronic file version yields a non-conclusive result.

3. The method according to claim 1, wherein the list of metadata entries comprise at least one of secure hashes or a SHA1 checksum for each of the one or more file items of the first electronic file version.

4. The method according to claim 1, further comprising:
receiving, from the second node, a request of at least one file item of the first electronic file version that is not pre-known in a knowledge base of the second node identified on the basis of the generated recipe of the first electronic file version and sending the requested at least one file item to the second node for enabling the reconstructing of the first electronic file version.

5. The method according to claim 1, further comprising:
identifying, at the first node, one or more file items previously unknown in a knowledge base of the first node and sending the identified one or more file items to the second node for enabling the reconstructing of the first electronic file version.

6. The method according to claim 1, wherein the first electronic file version to be scanned comprises a file of at least one of an Android Application Package (APK), a Portable Executable (PE), a Microsoft Soft Installer (MSI) or any other format capable of distributing and/or installing application software or middleware on a computer or a document container.

7. The method according to claim 1, wherein the step of comparing further comprises at least one of: calculating the differences between the content of first electronic file version to be scanned for malware and the content of the previously scanned electronic files, determining the smallest set of deletions and/or insertions to create one electronic file from the other, and displaying the result of the comparison.

8. The method according to claim 7, wherein considering if the previously scanned electronic file includes the predetermined number of the same or similar file items as the first electronic file version to be scanned further comprises calculating a similarity score based on the result of the comparison.

9. The method according to claim 1, wherein
the first node comprises a malware scanning agent, and
the second node comprises a malware scanning engine or application.

10. A method of remote malware scanning, the method comprising:
receiving, at a second node, a recipe of one or more file items of an first electronic file version to be scanned for malware from a first node, said recipe including at least information comprising an indication of:
the file items of the first electronic file version comprising information of a predetermined number of changed file items and same or similar file items that are pre-known based on a comparison by the first node, using meta data entries, a threshold achieving a required sufficiency of similarity, and a knowledge base, of file items of a previously scanned electronic files of the knowledge base and the file items of the first electronic file version, wherein the recipe is based on a result of a comparison of each of at least one registered file of one or more file items of the first electronic file version against a previously scanned electronic file version of a knowledge base to at least identify at least one file item determined to be missing from the previously scanned electronic file, and based on identifying that the at least one registered file of the first electronic file version has a predetermined number of same or similar file items to achieve a required sufficiency of similarity based on a threshold;
based on the recipe, reconstructing, at the second node, the first electronic file version received from the first node that are pre-known by assembling the at least one file item determined to be missing and the same or similar file items which is pre-known in the knowledge base of the second node to be minable; and
executing, at the second node, a dynamic malware analysis on a runtime behavior of the first electronic file version reconstructed to be runnable.

11. The method according to claim 10, further comprising:
identifying, at the second node, whether at least one file item of the first electronic file version is not pre-known in the knowledge base of the second node on the basis of the received recipe of the first electronic file version;
sending an instruction indicating the identified at least one file item of the first electronic file version from the second node to the first node, if at least one file item is identified as being not pre-known in the knowledge base of the second node.

12. The method according to claim 11, wherein identifying comprises:
checking the knowledge base for presence of information on the one or more file items contained in the first electronic file version, for which information for identification is included in the recipe;
determining for which at least one file item of the first electronic file version among all of the file items subject to the knowledge base checking no information is present in the knowledge base; and
identifying the at least one file item of the first electronic file version on basis of the determination.

13. The method according to claim 10, wherein
a result of the dynamic malware analysis and/or a result of the static malware is registered in the knowledge base, and/or
an overall malware scanning result of the first electronic file version is constructed on the basis of the results of the malware analysis of any one of the reconstructed electronic file, any file item of the first electronic file version, which is obtained from the first node, and any remaining file item of the first electronic file version, which is pre-known in the knowledge base of the second node, and the constructed overall malware scanning result is delivered from the second node to the first node.

14. The method according to claim 10, wherein
the recipe further includes a list of metadata entries comprising at least one of secure hashes or a SHA1 checksum for each of the one or more file items of the first electronic file version; and
wherein the knowledge base comprises a database of a reputation service, and any information in the knowledge base indicates a reputation of a subject file item and/or a subject electronic file, such as clean, infected or potentially unwanted.

15. The method according to claim 10, wherein
the first electronic file version to be scanned comprises a file of at least one of an Android Application Package (APK), a Portable Executable (PE), a Microsoft Soft Installer (MSI) or any other format capable of distributing and/or installing application software or middleware on a computer or a document container.

16. The method according to claim 10, wherein
the first node comprises a malware scanning agent, and
the second node comprises a malware scanning engine or application.

17. An apparatus, comprising
a memory configured to store computer program code, and
a processor configured to read and execute computer program code stored in the memory,
wherein the processor is configured to cause the apparatus to perform:
A) comparing, at a first node, one or more file items of a first electronic file version of an electronic file to be scanned for malware with a previously scanned electronic file version of a knowledge base of the first node, wherein the comparing is using a list of metadata entries identifying for a knowledge base at least one registered file of the one or more file items of the first electronic file version for scanning;
B) generating a recipe for one or more file items of the first electronic file version to be scanned,
wherein the generating is based on a result of the comparing each of the at least one registered file of the one or more file items of the first electronic file version against the previously scanned electronic file version of the knowledge base to at least identify at least one file item that is determined to be missing from the previously scanned electronic file, and identifying that the at least one registered file of the first electronic file version has a predetermined number of same or similar file items to achieve a required sufficiency of similarity based on a threshold;
C) based on the threshold, sending from the first node to the second node the generated recipe of the first electronic file version comprising the information and the indication of the at least one registered file for retrieval from the database and an indication of the at least one file item determined to be missing from the one or more file items of the first electronic file version for enabling the second node to reconstruct based on the recipe the predetermined number of changed file items and same or similar file items including the at least one file item determined to be missing to be runnable on a basis of the generated recipe; and
D) receiving, at the first node, a result of the dynamic malware analysis of the one or more file items including the at least one file item of the first electronic file version determined to be missing reconstructed to be runnable indicating it is infected with malware.

18. The apparatus according to claim 17, wherein the processor is configured to cause the apparatus to perform:
performing a malware property query for the first electronic file version and the one or more file items contained in the first electronic file version,
wherein the operations from A) to D) are initiated when the malware property query for at least one of the first electronic file version and the one or more file items contained in the first electronic file version yields a non-conclusive result.

19. The apparatus according to claim 17, wherein the recipe further includes a list of metadata entries comprising at least one of secure hashes or a SHA1 checksum for each of the one or more file items of the first electronic file version.

20. An apparatus, comprising
a memory configured to store computer program code, and
a processor configured to read and execute computer program code stored in the memory,
wherein the processor is configured to cause the apparatus to perform:
receiving, at a second node, a recipe of one or more file items of an first electronic file version to be scanned for malware from a first node, said recipe including at least information comprising an indication of: one or more file items of the first electronic file version and information of a predetermined number of changed file items and same or similar file items that are pre-known based on a comparison by the first node, using metadata entries, a threshold achieving a required sufficiency of similarity, and a knowledge base, of file items of a previously scanned electronic files of the knowledge base and the file items of the first electronic file version, wherein the recipe is based on a result of a comparison of each of at least one registered file of one or more file items of the first electronic file version against a previously scanned electronic file version of a knowledge base to at least identify at least one file item determined to be missing from the previously scanned electronic file, and based on identifying that the at least one registered file of the first electronic file version has a predetermined number of same or similar file items to achieve a required sufficiency of similarity based on a threshold;
based on the recipe, reconstructing, at the second node, the first electronic file version items received from the first node that are pre-known by assembling to be runnable the same or similar file items which are pre-know in the knowledge base and any remaining file item of the first electronic file version, which is pre-known in the knowledge base of the second node on the basis of the received recipe of the first electronic file version; and
executing, at the second node, a dynamic malware analysis on a runtime behavior of the reconstructed electronic file reconstructed to be runnable.

21. The apparatus according to claim 20, wherein the processor is configured to cause the apparatus to perform:
registering a result of the dynamic malware analysis and/or a result of the static malware in the knowledge base, and/or
constructing an overall malware scanning result of the first electronic file version on the basis of the results of the malware analysis of any one of the reconstructed electronic file, any file item of the first electronic file version, which is obtained from the first node, and any remaining file item of first electronic file version, which is pre-known in the knowledge base of the second node, and sending the constructed overall malware scanning result from the second node to the first node.

22. A non-transitory computer storage medium having stored thereon computer program code for implementing the method of claim 1.

* * * * *